United States Patent Office 3,590,008
Patented June 29, 1971

3,590,008
PROCESS FOR PREPARING LITHIUM
HYDROCARBIDE CATALYSTS
Virgil L. Hansley, Cincinnati, Ohio, and Fred K. Morgan, Cold Springs, Ky., assignors to National Distillers and Chemical Corporation, New York, N.Y.
No Drawing. Filed June 5, 1968, Ser. No. 734,519
Int. Cl. C07f 1/02
U.S. Cl. 252—429        3 Claims

ABSTRACT OF THE DISCLOSURE

A lithium catalyst is provided for polymerization of dienes and unsaturated monomers copolymerizable therewith. Lithium metal is coated on sodium or potassium chloride particles, and then converted to a lithium hydrocarbide catalyst, for production of lithium-terminated polymers, which polymers can then be reacted with compounds reactive with lithium organometallic compounds.

---

This invention relates to a lithium catalyst useful in the production of diene homopolymers and copolymers, and more particularly to a process for the production of active lithium in finely divided form for use in the preparation of lithium catalysts for preparing such diene polymers, and modified and graft diene homopolymers and copolymers, and to the lithium-catalyzed process for preparing such diene polymers, and to the polymers thereby produced.

It has long been known that conjugated aliphatic diolefins or vinyl aromatic compounds if reacted with an alkali metal can under selective conditions be dimerized (U.S. Pats. Nos. 2,816,913; 2,816,916; and 2,816,918, dated Dec. 17, 1957 to Hansley et al., and No. 3,013,071, dated Dec. 12, 1961, to Frank and Foster). The resulting compound can be carbonated to form the acid (U.S. Pat. No. 2,966,526, dated Dec. 27, 1960, to Hansley, Frank and Nobis). The process makes it possible to synthesize the higher aliphatic polyolefin hydrocarbons, such as octa-1,6-diene (U.S. Pat. No. 3,090,819, dated May 21, 1963 to Foster).

With the development of high polymers of olefinic hydrocarbons, research was stimulated in the use of this type of reaction to prepare polymers of polyolefin hydrocarbons, such as butadiene and isoprene.

It is now well recognized that alkali metals are excellent catalysts in the polymerization of such monomers to form terminally reactive polymers in which the alkali metal is found at one or both ends of the polymer chain. These polymers have been given the name "telechelic" in many of the patents in this field. "Telechelic" means there are alkali metal atoms at each end of the chain, and "semi-telechelic," that there is an alkali metal only at one end of the chain. Lithium is the preferred alkali metal, but sodium and potassium are said to be useful also, although the reaction products may be less stable in the sense that sodium and potassium tend to migrate from the terminal points of the polymer chain to internal positions, i.e., trans-metallate.

One of the earliest patents in this field is No. 3,135,716, granted on June 2, 1964, on an application filed Nov. 6, 1958, to Uraneck, Short and Zelinski. The monomers used can be a conjugated diene, such as butadiene, a vinyl-substituted olefin, such as styrene, acrylic acid esters, vinyl compounds such as vinyl chloride, and vinylidene compounds such as vinylidene chloride. The polymerization of the monomer proceeds in the presence of an organopolyalkali metal compound, having two to four alkali metal atoms, such as the reaction product of an organic polyhalide and an alkali metal, for example, 1,4-dilithobutane. The organopolyalkali compound initiates the polymerization, and the organic radical becomes incorporated in the polymer chain, with the alkali metal attached terminally at each end of the polymer chain:

or

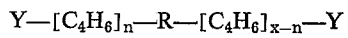

(Y is the alkali metal).

The terminally reactive alkali metal atoms can be replaced by various reagents to introduce other groups, or polymers to form block polymers. The number of possible reactions and end products is very extensive, and these form the subject of a large number of patents, of which the following are only exemplary.

| Patent No. | Date | Patentee(s) |
|---|---|---|
| 3,048,568 | 8/ 7/1962 | James W. Cleary |
| 3,055,952 | 9/25/1962 | Earl J. Goldberg |
| 3,074,917 | 1/22/1963 | William B. Reynolds |
| 3,078,254 | 2/19/1963 | Zelinski et al. |
| 3,084,141 | 4/ 2/1963 | Kraus et al. |
| 3,108,994 | 10/29/1963 | Zelinski et al. |
| 3,109,871 | 11/ 5/1963 | Zelinski et al. |
| 3,135,716 | 6/ 2/1964 | Uraneck et al. |
| 3,139,416 | 6/30/1964 | Lumb et al. |
| 3,147,313 | 9/ 1/1964 | Henry L. Hsieh |
| 3,150,209 | 9/22/1964 | Short et al. |
| 3,157,604 | 11/17/1964 | Charles W. Strobel |
| 3,175,997 | 3/30/1965 | Henry L. Hsieh |
| 3,177,190 | 4/ 6/1965 | Henry L. Hsieh |
| 3,193,590 | 7/ 6/1965 | Henry L. Hsieh |
| 3,214,421 | 10/26/1965 | John E. Mahan |
| 3,231,635 | 1/25/1966 | Holden et al. |
| 3,240,844 | 3/15/1966 | Jerry T. Gruver |
| 3,244,664 | 4/ 5/1966 | Zelinski et al. |
| 3,251,905 | 5/17/1966 | Zelinski et al. |
| 3,265,765 | 8/ 9/1966 | Holden et al. |
| 3,269,978 | 8/30/1966 | Short et al. |
| 3,281,335 | 10/25/1966 | Wentz, Jr. et al. |
| 3,317,918 | 5/ 2/1967 | Frederick C. Foster |

The remarkable and unique characteristic of the polymers that are formed by the reaction of No. 3,135,716 is that the alkali metal is found only at the terminal ends of the chain. This makes it possible to specifically control the structure of the base polymer and locate any additions that are attached to it. The polymer itself can be attached to another polymer containing substituents such as ester, amido, cyano, keto, sulfonyl, epoxy and aldehyde groups (but not active hydrogen atoms, as in some carbonyl, which contain α-hydrogen to the carbonyl, alcohol or amino groups), so as to form a graft polymer with the alkali metal-terminated polymer as one or more side chains. This process is described in U.S. Pat. No. 3,029,221, granted Apr. 10, 1962 to Welch.

Another technique for preparing graft polymers of alpha olefins is described in U.S. Pat. No. 3,187,067, dated June 1, 1965, to Beredjick. Beredjick used a metallic derivative of styrene polymers or copolymers containing halogen in the benzene nucleus, prepared by reacting the polymer with an alkali or alkaline earth metal or organometallic compound. This polymeric metallo-organic compound is used as one component of a coordinate catalyst system to effect polymerization of an alpha olefin. The second catalyst is a titanium or zirconium halide. The olefin becomes attached to the benzene nucleus of the styrene via the intermediary of the catalyst, forming polymeric side chains there. The final polymer is mostly polyolefin, containing from 1 to 10% polystyrene as the base polymer. Pats. Nos. 3,234,193 and 3,234,196 dated Feb. 8, 1966 to Leavitt describe similar lithiated polymers, in which the lithium is replaced with other organic compounds so as to form amide, ketone, alcohol, and epoxy groups on the benzene ring of the polystyrene. These polymers necessarily locate the grafted-on groups or polymers on the benzene group.

The preferred alkali metal in these processes is lithium, because of its specificity in nearly always locating itself at the end of a chain, if there is a choice of positions including that one, and in remaining located in a fixed position at the originally reactive site. Sodium has a tendency to migrate along a chain to which it may become attached, and thus gives rise to isomeric structures which may interfere with the uniformity of physical characteristics of the final polymer, or to similarly metallate neighboring chains, internally giving rise to mono and tri metallo-organic polymers.

Lithium has a different drawback, however, and that is the relative difficulty of reducing it to a high state of subdivision, for maximum surface area and reactivity. Lithium has a much higher melting point than sodium (186° C. vs. 97.5° C.), and at the temperatures at which it becomes molten, the usual dispersion media are subject to degradation or decomposition (of the dispersion medium when it is organic) and may also react with the lithium. Thus, it is not readily subdivided by dispersion as a melt, as is sodium. Consequently, to obtain a high surface area, a thin film of lithium "wetted" on a suitable carrier such as lithium chloride has been employed. Lithium chloride is hygroscopic, however, and this poses another problem.

U.S. Pat. No. 3,317,918 to Foster, dated May 2, 1967, suggests melting metallic lithium in a medium such as petroleum jelley, with high speed agitation to produce finely divided lithium dispersed in the jelly.

Also useful as catalysts in such reactions are lithium hydrocarbon compounds, such as butyl lithium, phenyl lithium, allyl lithium, and alfin-type lithium catalysts.

In accordance with the instant invention, a process for preparing lithium hydrocarbide catalysts is provided that supplies the lithium in a high state of activity, and the lithium catalysts obtained are capable of preparing metallated diene polymers including terminal lithium atoms at one or both ends of the chain. In this process, lithium is prepared in the form of a thin film on sodium or potassium chloride as a carrier at high temperature, and from this is prepared a lithium hydrocarbide or hydrocarbon adduct, which is the catalyst at ambient temperatures. This catalyst is useful in the polymerization of diene hydrocarbons, and of dienes and active monomers copolymerizable therewith.

The instant invention also provides a process for preparing diene polymers having lithium atoms attached thereto at terminal carbon atoms on the polymer chain, i.e., lithium telechelic or semi-telechelic polymers, as the term is used in this art. There are substantially no lithium atoms present at intermediate positions along the chain. The polymers of the invention can be and preferably are wholly aliphatic in nature, that is, there is little tendency to generate "branched" polymers.

The lithium diene polymers of the invention are quite versatile, and undergo the reactions of the lithium-terminated polymers of the prior art with reactive monomers and polymers. Due to the terminal positions of lithium atoms on the chain, block polymers are provided, or polymers containing reactive terminal groups.

As a preferred embodiment of the invention, a process is provided for preparing diene polymers having terminal alcoholic hydroxyl or aliphatic acid groups by reaction of the lithium terminated polymers with alkylene oxides, or with carbon dioxide, respectively. Such polymers can be made of any molecular weight, and can be processed on conventional equipment, and possess the desirable properties of the synthetic rubbers, combined with reactive hydroxyl or acid groups. Such polymers of the invention can be processed by reaction with compounds or polymers capable of reaction with such functional groups. Such polymers prepared in accordance with the invention have a greater versatility and a greater variety in properties than the synthetic rubbers, because of these functional process groups, which make it possible to introduce a variety of controlled physical and chemical properties.

It will be apparent from the nature of the lithium-containing base polymer that it is possible, also, in accordance with the invention to prepare a series of diene polymers which are quite unlike the synthetic rubbers in properties. This is possible by a selection of the lithium substrate polymer and the compound that is reacted therewith. Thus, the invention is in no way restricted to the preparation of synthetic rubber-like materials. It is, in fact, within the scope of the process of the invention to prepare polyfunctional polymers having a diene polymer base or substrate, having a plurality of carbon atoms on the base polymer chain to which are attached functional substituents reactive with a lithium group attached to terminal chain carbon atoms. Such substituents can be inert, or reactive with other compounds, so as to produce interesting block-type substituents on the base polymer.

In accordance with the invention, an olefin or diene polymer substrate is formed by the polymerization of a diene hydrocarbon or mixture thereof with a copolymerizable monomer, using a lithium hydrocarbide catalyst, in order to form a base polymer having one or two terminal lithium atoms thereon. In the next step in the reaction, the substituents lithium groups are reacted with or displaced by another compound reactive therewith, substituting on the substrate the substituent radical of that compound. The lithium-reactive compounds can in this way introduce a variety of substituents onto the substrate.

The substituent can if desired be polymerizable, or capable of reacting with another compound to form a polymer, so that it is capable of forming a block copolymer of high molecular weight. In this way, there can be imposed upon the substrate polymer one or two or a plurality of rather long terminal block copolymer chains. These, depending upon the nature of the monomer, can be aliphatic, cycloaliphatic, aromatic, or heterocyclic, or mixtures thereof, in nature, but in all cases, of course, the base polymer molecule will be aliphatic in character. Thus, by a proper selection of the diene substrate polymer, the block copolymer chains, and the relative molecular weights of each, it is possible to produce block copolymers which are similar to synthetic rubbers in their properties. It is also possible to produce aliphatic-base block copolymers or polymers having functional groups which are tailor-made for any desired purpose.

The diene substrate polymer chain has one or two terminal active lithium atoms, at one or at each end of the polymer chain. The following reaction is illustrative:

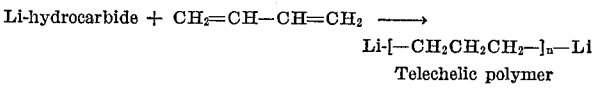

Telechelic polymer

In the next stage of the process, these lithium groups are substituted by another group, derived from a compound reactive with an organolithium metal compound, such as an organic monomeric compound which is capable of polymerization to form a long side chain on the polymer molecule. The following reaction of polybutadiene lithium with ethylene oxide is illustrative:

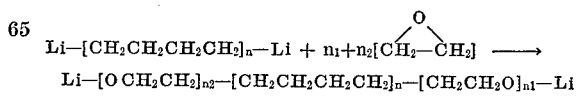

In this reaction, $n$ represents the number of butadiene units and $n_1$ and $n_2$ represent the number of ethylene oxide units in the polymeric end chains that become attached to the terminal carbons formerly bearing the lithium atom. There will of course be one or two such end chains in the final molecule, corresponding to the number of lithium atoms in the reactant.

THE LITHIUM HYDROCARBIDE CATALYST

The lithium metal can be distributed on the sodium or potassium chloride in a variety of ways. The simplest and most expeditious is to grind the sodium or potassium chloride to a very fine particle size, less than 10 microns, usually, and preferably less than 5 microns. This can be done in a suitable mill, such as a ball mill, in an inert solvent such as toluene or xylene, which is removed thereafter, and the powdered salt is then dried.

The powdered salt is placed under an inert atmosphere (inert to lithium), such as argon or krypton. The lithium metal is added, and the temperature is brought to above the melting point of lithium (over 186° C.), usually from 200 to 250° C. The salt can be preheated to this temperature, if desired. It is normally not desirable to exceed 250° C., so as to avoid interchange between lithium and sodium or potassium in the salt carrier. The mixture is stirred to coat the salt particles uniformly with a molten lithium film and the coated salt is then cooled to below 186° C. to solidify the lithium film. A dispersion agent for the lithium is not usually necessary.

The lithium-coated salt then is reacted with a hydrocarbon or halide derivative of a hydrocarbon to form the lithium hydrocarbide catalyst at ambient temperature in a suitable solvent medium. Naphthalene is a preferred hydrocarbon, but any suitable aliphatic, aromatic, or cycloaliphatic hydrocarbon can be used as the lithium carrier in the catalyst.

The lithium hydrocarbides generally operable to produce the improved polymers of the invention are derived from hydrocarbons having from one to forty carbon atoms, in which lithium has replaced one or more hydrogen atoms. Suitable lithium hydrocarbides include, for example, the alkyl lithium compounds, such as methyl lithium, ethyl lithium, butyl lithium, amyl lithium, hexyl lithium, 2-ethylhexyl lithium, n-dodecyl lithium and n-hexadecyl lithium. Unsaturated lithium hydrocarbides are also operable, such as allyl lithium, and methallyl lithium. Also operable are the aryl, alkaryl, and aralkyl hydrocarbides, such as phenyl lithium, the isomeric tolyl and xlyyl lithiums, and alpha- and beta-naphthyl lithiums. Cycloalkyl lithium compounds, such as cyclohexyl lithium and cyclopentyl lithium can be empoyed. Mixtures of lithium hydrocarbides can also be employed. Desirable catalysts can also be prepared by reacting lithium hydrocarbide successively with an alcohol and then with an olefin, such as isopropylene (a technique analogous to the "Alfin" technique), whereby a limited portion of the lithium from the hydrocarbide forms lithium alkoxide, and lithium olefin.

Surprisingly, the catalytic action of the lithium hydrocarbide catalysts employed to produce the polymers of the invention does not appear to be affected by the presence of sodium or potassium salts. Hence, it is not necessary to separate any excess lithium-coated sodium or potassium chloride from the lithium hydrocarbide that is formed therefrom. In the synthesis of lithium hydrocarbides, lithium halides are produced as by-products, while in catalysts produced by the "Alfin" technique, lithium alkoxides are formed.

More rapid polymerization reactions and polymers of higher molecular weight may be obtained by utilizing a polylithium hydrocarbide either alone or in admixture with a lithium hydrocarbide. In polylithium hydrocarbides, lithium has replaced a plurality of hydrogen atoms of the hydrocarbon. Suitable polylithium hydrocarbides include alkylene dilithium compounds, such as methylene dilithium, ethylene dilithium, dimethylene dilithium, trimethylene dilithium, pentamethylene dilithium, hexamethylene dilithium, decamethylene dilithium, octadecamethylene dilithium, and 1,2-dilithium propane. Polylithium alkyl, alkaryl, and aralkyl compounds, such as 1,4-dilithium benzene, 1,4-dilithium naphthalene, 1,2-dilithium 1,2,3-triphenyl propane, and the like can be employed. Tri- and higher lithium hydrocarbons are also operable, such as 1,3,5-trilithium pentane or 1,3,5-trilithium benzene.

Preferably, the catalyst is employed shortly after preparation, although it can be stored for reasonable periods of time, if kept under an inert atmosphere during removal from the vessel in which the catalyst is prepared, during storage, and during subsequent introduction into the reaction chamber. The catalyst often can be produced in situ in the reaction vessel.

In general, the larger the amout of catalyst used, the more rapidly the polymerization will proceed at a given temperature, and the lower the molecular weight of the resulting product. Desirably, sufficient catalyst should be employed to provide from 0.001 to about 0.5 gram of active lithium for each 100 grams of monomer in the polymerization mixture.

If a pure lithium catalyst is used, the most important factors influencing the structure and properties of the polymer obtained, the speed of reaction, and the yield, are:

(1) Purity of monomer.
(2) Concentration of moisture, oxygen and air.
(3) Temperature of the reaction.

The dienes which are employed in the process of the invention are the conjugated dienes containing from four to twelve carbon atoms per molecule, and preferably four to eight carbon atoms per molecule. Exemplary are 1,3-butadiene, isoprene, 2,3-dimethyl-1,3-butadiene, 1,3-pentadiene (piperylene, 2-methyl-3-ethyl-1,3-butadiene, 3-methyl-1,3-pentadiene, 2-methyl-3-ethyl-1,3-pentadiene, 2-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, phenyl-1,3-butadiene, 2,3-diethyl-1,3-butadiene, 2,3-din-propyl-1,3-butadiene, 2-methyl-3-isopropyl-1,3-butadiene and the like. Conjugated dienes containing halogen and alkoxy substituents along the chain can also be employed, such as chloroprene, fluoroprene, 2-methoxy-1,3-butadiene, 2-ethoxy-3-ethyl-1,3-butadiene, and 2-ethoxy-3-methyl-1,3-hexadiene. Conjugated dienes can be polymerized alone or in admixture with each other to form copolymers, or block copolymers. Block copolymers can be prepared from two or more conjugated dienes by charging one compound initially, allowing it to polymerize, and then adding a second conjugated diene and allowing it to polymerize. Preferred conjugated diolefins are butadiene, isoprene and piperylene.

As polymerizable monomers, there can also be used monomers containing a $CH_2=<$ group, such as the vinyl-substituted aromatic compounds including styrene, 1-vinylnaphthalene, 2-vinylnaphthalene, and alkyl, cycloalkyl, aryl, alkaryl, aralkyl, alkoxy, aryloxy, and dialkylamino derivatives thereof in which the total number of carbon atoms in the combined substituents is generally not greater than twelve. Examples of these aromatic monomers include:

3-methylstyrene (3-vinyltoluene),
3,5-diethylstyrene,
4-n-propylstyrene,
2,4,6-trimethylstyrene,
4-dodecylstyrene,
3-methyl-5-n-hexylstyrene,
4-cyclohexylstyrene,
4-phenylstyrene,
2-ethyl-4-benzylstyrene,
4-p-tolylstyrene,
3,5-diphenylstyrene,
2,4,6-tri-tert-butylstyrene,
2,3,4,5-tetramethylstyrene,
4-(4-phenyl-n-butyl)styrene,
3-(4-n-hexylphenyl)styrene,
4-methoxystyrene,
3,5-diphenoxystyrene, 3-decoxystyrene,
2,6-dimethyl-4-hexoxystyrene,
4-dimethylaminostyrene,
3,5-diethylaminostyrene,
4-methoxy-6-di-n-propylaminostyrene,
4,5-dimethyl-1-vinylnaphthalene,
3-ethyl-1-vinylnaphthalene,
6-isopropyl-1-vinylnaphthalene,
2,4-diisopropyl-1-vinylnaphthalene,
3,6-di-p-tolyl-1-vinylnaphthalene,
6-cyclohexyl-1-vinylnaphthalene,
4,5-diethyl-8-octyl-1-vinylnaphthalene,
3,4,5,6-tetramethyl-1-vinylnaphthalene,
3,6-di-n-hexyl-1-vinylnaphthalene,
8-phenyl-1-vinylnaphthalene,
5-(2,4,6-trimethylphenyl)-1-vinylnaphthalene,
3,6-diethyl-2-vinylnaphthalene,
7-dodecyl-2-vinylnaphthalene,
4-n-propyl-5-n-butyl-2-vinylnaphthalene,
6-benzyl-2-vinylnaphthalene,
3-methyl-5,6-diethyl-8-n-propyl-2-vinylnaphthalene,
4-o-tolyl-2-vinylnaphthalene,
5-(3-phenyl-n-propyl)-2-vinylnaphthalene,
4-methoxy-1-vinylnaphthalene,
6-phenoxy-1-vinylnaphthalene,
3,6-dimethylamino-1-vinylnaphthalene, 7-dihexoxy-2-vinyl-naphthalene and the like. The presence of a small amount of polar compound such as the solvent used in preparing the catalyst encourages random copolymerization between conjugated dienes and the vinyl-substituted aromatic compounds.

Certain polar momoners can be employed to form block copolymers with conjugated dienes. Such polar monomers also can be copolymerized with dienes, and can be used in an amount up to 50% of the diene to form a copolymer. When preparing the block copolymers the polar monomer is introduced after the non-polar monomers have polymerized. These polar monomers include vinylpyridines and vinylquinolines in which the vinyl group is attached to a ring carbon other than a carbon in the beta position with respect to the nitrogen. These pyridine, quinoline or isoquinoline derivatives can contain substituents such as alkyl, cycloalkyl, aryl, alkaryl, aralkyl, alkoxy, aryloxy and dialkylamino groups in which the total number of carbon atoms in the combined substituents does not exceed twelve. Any alkyl groups on the alpha or gamma carbons with respect to the nitrogen should be tertiary alkyl groups. Examples of polar monomers applicable include:

2-vinylpyridine,
4-vinylpyridine,
3,5-diethyl-4-vinylpyridine,
5-methyl-2-vinylpyridine,
5-n-octyl-2-vinylpyridine,
3-n-dodecyl-2-vinylpyridine,
3,5-di-n-hexyl-4-vinylpyridine,
5-cyclohexyl-2-vinylpyridine,
4-phenyl-2-vinylpyridine,
3,5-di-tert-butyl-2-vinylpyridine,
3-benzyl-4-vinylpyridine,
6-methoxy-2-vinylpyridine,
4-phenoxy-2-vinylpyridine,
4-dimethylamino-2-vinylpyridine,
3,5-dimethyl-4-diamylamino-2-vinylpyridine,
2-vinylquinoline,
4-vinylquinoline,
2-tert-butyl-4-vinylquinoline,
3-methyl-4-vinylquinoline,
3-cyclohexyl-4-vinylquinoline,
3-methyl-4-ethoxy-2-vinylquinoline,
1-vinylisoquinoline,
3-vinylisoquinoline,
4-tert-dodecyl-1-vinylisoquinoline,
3-dimethylamino-3-vinylisoquinoline,
4-benzyl-3-vinylisoquinoline,
4-phenyl-1-vinylisoquinoline, acrylic and alkacrylic acid esters, nitriles, and N,N-disubstituted amides, such as methyl acrylate, ethyl acrylate, butyl acrylate, methyl methacrylate, ethyl methacrylate, propyl methacrylate, butyl methacrylate, methyl ethacrylate, ethylethacrylate, isopropyl ethacrylate, acrylonitrile, methacrylonitrile, N,N - dimethylacrylamide, and N,N-diethylmethacrylamide. Vinylfuran and N-vinylcarbazole can also be used.

High cis-1,4-structure and lower 1,2-structure are obtained with highly pure monomeric material.

It is desirable that the monomer be handled at all times in contact only with its own vapor or with atmospheres containing only its own vapor and an inert gas, such as helium or argon. Oxygenated organic compounds such as ethers and esters must be rigorously excluded from the reaction mixtures. Moreover, nitrogen and nitrogenous compounds such as amines and the like must also be excluded, since nitrogen reacts with lithium.

Since moisture tends to destroy catalyst, it should be excluded. Oxygen, nitrogen and other components of the air seriously inhibit the desired polymerization reaction and consequently should be excluded from the reaction zone.

The molecular weight and proportion of cis-1,4-structure of the polymers in accordance with the invention generally increase as the temperature of polymerization is decreased. However, the reaction is quite difficult to control at elevated temperatures, particularly where monomer of the preferred highest purity is employed. Gel content increases also, as higher polymerization temperatures are employed. Consequently, it is desirable to operate at the lowest temperature at which a practical yield of the desired product can be obtained. Since polymerization reactions of the type contemplated ordinarily require a considerable induction period, it is often desirable to initiate the polymerization reaction at a higher temperature and then reduce the temperature to the reaction temperature. In this manner, the induction period will be shortened and the benefits of low temperature polymerization are obtained. In general, the polymers of the invention are produced at temperatures between −100° C. and 150° C. A polymerization temperature of from 0 to 80° C. is preferred.

The monomers can be polymerized in either liquid or vapor phase, but desirably the polymerization reaction is carried out in a suitable inert organic solvent, which are non-polar, non-acidic, organic substances. Suitable solvents include the saturated aliphatic hydrocarbon solvents, such as the straight and branched chain paraffins and cycloparaffins containing from three to sixteen carbon atoms which include propane, pentane, hexane, petroleum ether, heptane, dodecane, cyclopentane, cyclohexane and methyl cyclohexane, and methyl cyclohexane, and aromatic solvents such as benzene, toluene and xylene. In some polymerizations ethers may be employed.

Polymerization reactions producing the polymers of the invention may conveniently be conducted in closed reactors. The catalyst may be added by weight or, where possible, by volume. The removal of oxygen from the free air space above the monomer in the polymerization reactor as well as dissolved oxygen in the monomer is an important step. After the induction period, the reaction mixture goes through a period of thickening and finally becomes semi-solid. At the end of the polymerization reaction, when properly conducted, all of the monomer has been consumed and there is a partial vacuum in the free space of the reaction vessel. If the polymer is to be further reacted with an organic substituent-forming compound, reactive with the terminal lithium atoms thereon, it is not necessary to separate the polymer from the reaction mixture. The solvent can be separated from any solid materials and then used as such in the next step. However, if the polymer is desired, without further reaction, isolation is carried out at this point.

After polymerization has been completed, and the reactor cooled to handling temperature, the polymer can be isolated by the following procedure. Preferably, the crude polymer will be washed immediately on a wash mill to remove the catalyst. An antioxidant, for example 3% phenyl-beta naphthylamine, is added desirably as soon as the catalyst has been destroyed and water washing is then commenced. Cold water will preferably be employed to minimize oxidation of the polymer. In order to recover the polymer with a minimum degree of oxidation, it is preferred that the polymer, after being removed from the reaction vessel, be immediately immersed in an alcohol, such as methanol, containing about 3% antioxidant. The methanol destroys the catalyst and carries the antioxidant into the polymer mass.

In large scale polymerization processes, usually the reaction is carried out in a closed autoclave provided with a heat transfer jacket and a rotary agitator. Avoidance of oxygen contamination is most easily secured by evacuating the vessel prior to charging the monomer (and solvent), and employing an inert atmosphere. To ensure the purity of the monomer and solvent, a silica gel or other suitable absorption column is preferably inserted in the charging line employed for introduction of these materials to the reactor. The catalyst is preferably charged last, conveniently from an auxiliary charging vessel pressured with an inert gas and communicating with the polymerization vessel through a valved conduit. It is desirable to provide a reflux condenser to assist in the regulation of the reaction temperature. Upon completion of polymerization, the polymer can be recovered and immersed under the surface of the body of methanol, isopropanol, or other alcohol containing an antioxidant, and agitated therewith to precipitate the polymer, destroy the catalyst and incorporate the antioxidant. The precipitated mass can be milled with water on a wash belt to remove the alcohol and additional antioxidant may be incorporated during this operation. The polymer is then dried for storage and use.

THE ORGANIC SUBSTITUENT-FORMING COMPOUND

As the organic substituent-forming compound there can be employed any compound capable of reacting with a lithium atom directly attached to carbon. If it is a monomer, and polymerization is desired, it is itself polymerizable in the presence of lithium hydrocarbide or free lithium metal. These compounds contain as component radicals the substituent radical itself, and another group that is reactive with the lithium, and in many cases (but not all) is lost to the lithium, to form a lithium compound as a by-product, while the substituent radical becomes attached to the terminal carbons of the polymer substrate chain. Lithium-reactive groups that can be present on these compounds include halide, for instance, chloride, bromide and iodide, olefinic carbon-to-carbon double bonds having a reactive hydrogen or halide atom on a carbon atom thereof, thio groups, hydroxyl groups, keto groups, acid halide groups, acid groups, amide and amino groups, and cyclic-1,2-oxyether groups, as in the alkylene oxides.

The olefins are conjugated, and can have from about four to about twenty carbon atoms and from two to four olefinic groups. Of these, at least two must be conjugated. The higher the molecular weight, the slower the reaction that takes place, so consequently it is preferred that the olefin have less than ten carbon atoms.

Typical conjugated olefins include 1,3-butadiene, isoprene, 2,3-dimethylbutadiene, piperylene, dimethylpentadiene, methyl isoprene, 1-phenyl-butadiene and divinyl benzene. Styrene and alkyl-substituted styrenes such as methyl styrene and dimethyl styrene can also be employed. Higher trienes and tetraenes include dibutadiene and 1,3,5-hexatriene.

Other types of lithium-reactive monomers also can be employed.

Carbon disulfide will produce terminal dithiocarboxy derivatives of the olefin substrate polymer. The dithiocarboxy groupings which then result at the ends of the chain can be further reacted, using reactants reactive with

groups, such as alcohols, to produce thioesters. Acid chlorides and diacid chlorides will give terminal keto rubbers. Diacid chlorides will react with glycols to give terminal copolymer block chains with ester groups; thus, for example, succinic acid chloride, adipic acid chloride, malonic acid chloride, and glutaric acid chloride, and epoxides, like ethylene oxide, and propylene oxide, can be reacted to produce polymeric ester end chain block copolymers.

Aliphatic, cycloaliphatic and aromatic halides can react, and in some cases form terminal chains of considerable length. Thus, for instance, ethyl chloride and ethylene dichloride, cyclohexyl chloride, 1,4-dichlorocyclohexyl chloride, $\alpha,\beta$-dichloroethyl benzene, chlorobenzene and paradichlorobenzene can be used to produce monomeric and polymeric aliphatic and aromatic terminal chains.

Elemental sulfur can be reacted with the alkali metal groups to produce mercapto groups, which can then be modified by further reaction to produce terminal chains linked to the substrate polymer by sulfur ether groups. In this way, sulfur-containing rubbers can be obtained. Oxygen will react to give peroxides or a primary product, decomposable to ketones and alcohols.

Compounds having the structure $XNR_1R_2$ where X is halogen, such as chlorine, bromine or iodine, will give disubstituted amino terminal chains on the substrate polymer. These also have unusual properties, and can be further reacted if desired, depending upon the nature of $R_1$ and $R_2$, to produce lengthy terminal chains linked to the substrate polymer by a nitrogen atom.

Similarly, sulfinic and sulfonic groups attached to the substrate polymer can be obtained by reacting the polymer with $SO_2$, $SO_2Cl_2$, $SOCl_2$ and like compounds. Chlorine, bromine or iodine can be reacted with the lithium to give a halogen-containing polymer, and these also can be further reacted to produce terminal groups.

Alkylene oxides such as ethylene oxide, propylene oxide, 1,3- and 1,2-cyclohexene oxide, butylene oxide-1,3 and -1,2-butadiene oxide, styrene oxide, and the like, or fully substituted acetones, react with the lithium groups to create compounds containing one hydroxyl group for each lithium atom present. Such polymers have desirable properties because of the presence of the hydroxyl group, and this group can itself be reacted with other materials, such as acids, and acid chlorides, to produce interesting terminal chains. If the acid or acid chlorides are polyfunctional, and a glycol is included as well, polymeric ester terminal chains will be obtained.

It is apparent from the above that the process of the invention has considerable versatility, and can be used to produce a wide variety of block polymers, based on the diene substrate polymer.

The proportion of organic compound reacted with the lithium groups on the substrate polymer can be varied greatly, and is in no way critical. As little as 0.01% by weight of the substrate polymer will noticeably modify the properties of the polymer. There is no real upper limit on the amount of substituent that can be introduced, but of course when the amount is very high, the original properties of the substrate polymer may be so modified as to virtually disappear, the resulting product displaying primarily the characteristics of the terminal substituents instead. If, for example, the combined molecular weight of the terminal polymer is much greater than that of the substrate polymer, then obviously the properties of the terminal polymer can greatly outweigh the properties of the base.

Thus, usually the amount of substituent that is introduced will not exceed about 200% by weight of the substrate polymer. Preferably, the amount of substituent is within the range of about 80 to about 150%, for a substituent that is polymeric in nature, such as an olefin, or vinyl compound, and within the range from about 0.01 to about 5%, for a substituent that is monomeric in nature, such as a halogen atom, an epoxide group, a thioacid group, and a carboxylic acid group.

The reaction between the lithium polymer substrate product with the organic substituent-forming compound are most conveniently carried out in the presence of an inert organic solvent, although if one or more of the reactants are liquid at the reaction temperature, a solvent may not be necessary. The solvent must be non-polar, unless it is the monomer itself. The solvent that is most desirable for a particular type of polymer is best determined by trial and error. The concentration of the reactants in the solvent is in no way critical, and can range from as little as 5% to as much as 80%, depending upon solubility of the reactants and the reaction products.

Exemplary solvents are the paraffinic hydrocarbons, such as hexane, octane, isooctane, nonane; aromatic hydrocarbons such as benzene, toluene, mesitylene, xylene, and ethyl benzene; cycloaliphatic hydrocarbons such as cyclohexane, and the naphthenes; and the petroleum-derived solvents such as the petroleum ethers. Monoolefins are suitable as solvents, such as 2-butene. The solvent should of course be a liquid under the reaction conditions, which include superatmospheric pressure.

The reaction system must be anhydrous, and oxygen must be excluded. An inert atomsphere is necessary; any inert gas can be used, such as nitrogen, helium, and argon or the reaction can be done in a vacuum system with only the vapor pressure of solvent in the free space over the reaction medium.

The reaction proceeds best at an elevated temperature, although in many cases a slow reaction at room temperature will be observed. The preferred reaction temperature is within the range from about 50 to about 70° C. It is not normally desirable to exceed 100° C., because of complicated side reactions which may then occur, but if the reaction is carefully watched, it may be possible to use temperatures as high as 150 to 200° C., in some cases.

The reaction proceeds rather rapidly, and can be complete in as little as one or two hours. Reaction times in excess of about eight to ten hours are not usually required.

Upon completion of the reaction, the polymer can be precipitated from the reaction solution or mixture by addition of a non-solvent for the polymer, such as an aliphatic alcohol or acetone. The precipitated material can then be removed by centrifuging or by filtration, and, after washing, is ready for processing.

The following examples in the opinion of the inventors represent preferred embodiments of the process and product of the invention.

EXAMPLE 1

Sodium chloride (100 grams) previously wet-ground in a ball mill in xylene to 1–5 microns, and azeotropically distilled in the xylene to remove the last traces of water, was placed in a liter glass flask equipped with a rugged stirrer, a heating mantle, an argon purge and an efficient condenser. With stirring, the xylene is removed and the salt heated to 240° C. A charge of 7.0 grams (1 mol) of lithium metal (M.P. 186° C.) was added, and melted, and dispersed over the salt as a thin coating by vigorous stirring. The salt-coated with lithium film was allowed to cool to room temperature to solidify the lithium, and 1000 cc. of diethyl ether was added. Then, 64 grams (0.5 mol) of purified naphthalene was introduced into the argon-filled flask unit. Some heat was evolved, and this was removed by refluxing the ether, taking care to add the naphthalene only as fast as the reflux condenser could remove the heat of reaction. The resulting slurry of green to black lithium naphthalene and salt was then ready for use as a catalyst. The total weight of the mixture was 883 grams. One gram of this slurry contained 1.1 milliequivalents of active lithium, or enough to produce 1.1 grams of butadiene polymer of about 2000 molecular weight.

EXAMPLE 2

In an all-metal stainless steel reactor was charged 300 grams of ball-milled, azeotropically-dried 1–3 micron particle size sodium chloride. The vessel was equipped with a heating element, and a soldered-on coil of tubing for rapid cooling. A reflux condenser cooled by Dry-Ice-methanol, argon blanketing, and means of feeding in inert solvent, were also provided.

The salt was heated with stirring to 200° C., whereupon 42 grams of lithium was added in five increments, with rapid agitation. This required about 5 minutes. The molten lithium was thoroughly distributed on the salt particles, and the mass was allowed to cool, with moderate stirring. When the temperature had fallen to about 20–25° C., a solution (suspension) of 384 grams naphthalene in 4 liters of diethyl ether was slowly introduced, to allow heat generated to be removed by the refluxing ether. 6.05 moles (6050 milliequivalents) of lithium were thus dispersed in the salt-naphthalene-solvent system slurry. Total weight of this preparation was 2556 grams. Therefore, each gram of this slurry contained 2556/6050 or 0.425 milliequivalent of active lithium.

EXAMPLE 3

A standard 5 liter three-neck flask was equipped with a stirrer, reflux condenser, dropping funnel, thermometer and argon blanketing arrangement. One liter of commercial dry hexane was charged into the flask, with 765 cc. of a slurry of lithium naphthalene, lithium coated-, sodium chloride catalyst prepared according to Example 1. The lithium catalyst slurry had a titre equivalent to 1.6 milliequivalents per cc., making a total of 1220 milliequivalents for the reaction. The reaction mixture was brought to and held at 20–44° C., while a total of 612 g. isoprene was fed into the flask, at a rate of 8 cc. per minute. After standing overnight, 88.7 grams of ethylene oxide (an excess) was added rapidly to the stirred isoprene polymer, yielding in a few minutes a highly viscous reaction product.

The reaction mixture was neutralized by adding 100 cc. of concentrated HCl to the flask slowly, with rapid stirring, which destroyed the thick soap-like consistency, and gave a solution of polymer which was washed free of chloride with water. The solvent was removed by vacuum, and the naphthalene by vacuum-argon purging. The yield was quantitative. The hydroxyl value was 83 (mg. KOH/g.), which corresponds to a molecular weight of 1350. This material had a microstructure of:

| | Percent |
|---|---|
| 3,4-vinyl | 48.8 |
| 1,2-vinyl | 3.5 |
| 1,4-(cis+trans) | 47.7 |

The diene polymers produced by the lithium hydrocarbide catalysts of the invention are known materials, and have known utilities, as is disclosed in any of the patents noted heretofore, at cols. 1 to 3, inclusive.

The polymers modified in accordance with the invention by reaction of the terminal lithium atoms with functional compounds reactive therewith have in general the utilities of the polymer starting materials from which they are prepared, but their improved properties may increase the range of utility and/or may improve their suitability for the general end uses of such polymers. Thus, for example, the rubber-like materials produced in accordance with the invention are useful in the manufacture of tires for vehicles of all kinds. Similarly, synthetic rubbers, such as butadiene, isoprene, styrene, can be used after modification in the manufacture of vehicle tires, as gasketing materials, and as materials of construction where the physical properties of these polymers are desirable.

In many cases, the improved polymers will have utilities that the starting materials did not have, because of some difficult physical property. For example, a trans-4-polybutadiene has excellent toughness, but poor workability. By grafting block copolymer end chains of appropriate microstructures in accordance with the invention on the trans-4-butadiene substrate, the polymer can be internally plasticized, and the tough products made available in a host of new applications, such as mechanical rubber goods and vehicle tires, to mention but two.

The grafting of functional groups in accordance with the invention onto elastomeric type polymer chains, such as the alfin rubbers, can change the elastomer response. Introduction of end groups having epoxy linkages can produce elastomers which have better adhesive properties, and which can be cross-linked to yield rigid structures, by reaction of the side chain epoxy groups. Moisture permeability can thus be improved, if desired.

Vulcanizability can be introduced into saturated polymer substrates, such as polyethylene, polypropylene, butyl rubber, and ethylene-propylene rubbers, by grafting short polybutadiene chains onto these polymers, in accordance with the invention. These unsaturated chain end polymer blocks can be vulcanized. In this way, vulcanizable chains can be introduced, containing only enough unsaturation to permit vulcanization, without diminution of the other desirable properties of the saturated substrate polymers. This is a less expensive approach than the introduction of a third monomer unit into, for example, the ethylene-propylene copolymers, because of the difficulty of simultaneously polymerizing three monomers to obtain a satisfactory product under reproducible conditions in a commercial process. Thus, the resistance to oxidation and high oil resistance generally associated with saturated polymer chains can be brought into the field of use of a sulfur- or peroxide-curable polymer. It will be apparent from the preceding description that in this way tailor-made products for specific uses in the elastomer field can be prepared at a relatively low cost.

Having regard to the foregoing disclosure, the following is claimed as the inventive and patentable embodiments thereof:

1. A process for preparing lithium hydrocarbide catalysts that supply the lithium in a high state of activity, and are capable of preparing from monomeric dienes metallated diene polymers including terminal lithium atoms at one or both ends of the chain, comprising dispersing molten lithium at a temperature above about 186° C. under an inert atmosphere in the form of a thin film on particulate sodium chloride or potassium chloride as a carrier, and reacting the resulting lithium-coated particles with a hydrocarbon or hydrocarbon monohalide having from one to forty carbon atoms to form a lithium hydrocarbide or hydrocarbon adduct, and recovering as the catalyst a mixture of lithium-coated sodium chloride or potassium chloride and the lithium hydrocarbide or hydrocarbon adduct, useful in the polymerization of diene hydrocarbons, and of dienes and active monomers copolymerizable therewith.

2. A process in accordance with claim 1, wherein the temperature is between about 200 and about 250° C.

3. A process in accordance with claim 1, wherein the hydrocarbon is naphthalene.

References Cited

UNITED STATES PATENTS

| | | | |
|---|---|---|---|
| 3,135,716 | 6/1964 | Uraneck et al. | 260—665X |
| 3,193,590 | 7/1965 | Hsieh | 260—665 |
| 3,278,508 | 10/1966 | Kahle et al. | 252—431X |
| 3,312,680 | 4/1967 | Kahle | 252—431X |

PATRICK P. GARVIN, Primary Examiner

U.S. Cl. X.R.

252—431R; 260—665, 887, 94.7